United States Patent
Sasage

(10) Patent No.: US 7,328,452 B2
(45) Date of Patent: Feb. 5, 2008

(54) METHOD AND DEVICE FOR COPING WITH ILLEGAL ACCESSES TO A DATA SERVER

(75) Inventor: Taiji Sasage, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 934 days.

(21) Appl. No.: 10/265,406

(22) Filed: Oct. 7, 2002

(65) Prior Publication Data

US 2003/0172288 A1    Sep. 11, 2003

(30) Foreign Application Priority Data

Mar. 7, 2002    (JP)    ............... 2002-061800

(51) Int. Cl.
*G06F 21/00* (2006.01)
*G06F 11/00* (2006.01)
*G06F 9/00* (2006.01)

(52) U.S. Cl. ............... 726/22; 713/100; 714/38

(58) Field of Classification Search ............... None
See application file for complete search history.

(56) References Cited

U.S. PATENT DOCUMENTS

| | | | |
|---|---|---|---|
| 6,167,494 A * | 12/2000 | Cheston et al. | 711/162 |
| 6,845,464 B2 * | 1/2005 | Gold | 714/6 |
| 6,915,420 B2 * | 7/2005 | Hensley | 713/2 |
| 6,934,881 B2 * | 8/2005 | Gold et al. | 714/15 |
| 7,024,581 B1 * | 4/2006 | Wang et al. | 714/2 |
| 2004/0044890 A1 * | 3/2004 | Lim et al. | 713/2 |
| 2004/0153724 A1 * | 8/2004 | Nicholson et al. | 714/6 |

* cited by examiner

*Primary Examiner*—Christopher Revak
(74) *Attorney, Agent, or Firm*—Staas & Halsey LLP

(57) ABSTRACT

The secondary OS is executed on the primary OS running on a computer, and a data server is implemented in the computer by executing an application program on the secondary OS. Then, executing an illegal access coping program on the primary OS, the computer accesses the data server, judges whether a response to the access received from the data server is normal or abnormal and obtains data stored in memory managed by the secondary OS if it is judged that the response is abnormal.

7 Claims, 13 Drawing Sheets

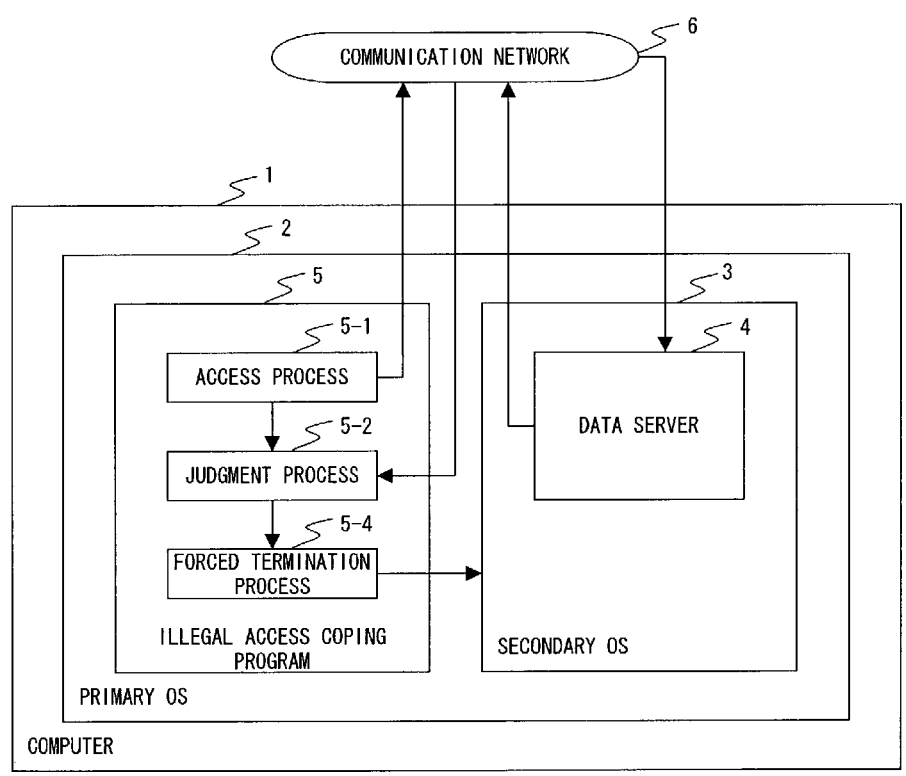
F I G. 2

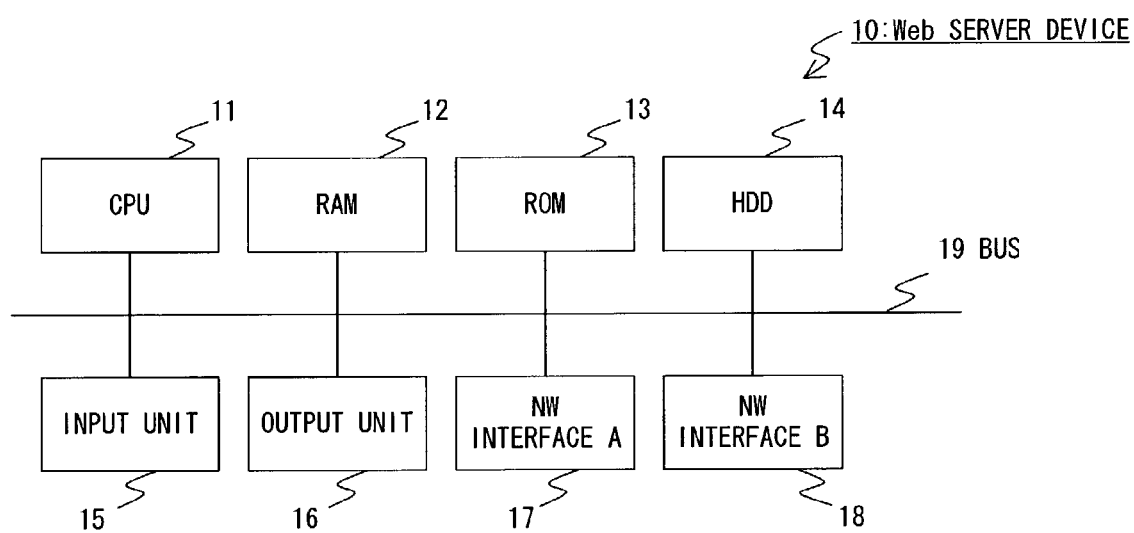
F I G. 3

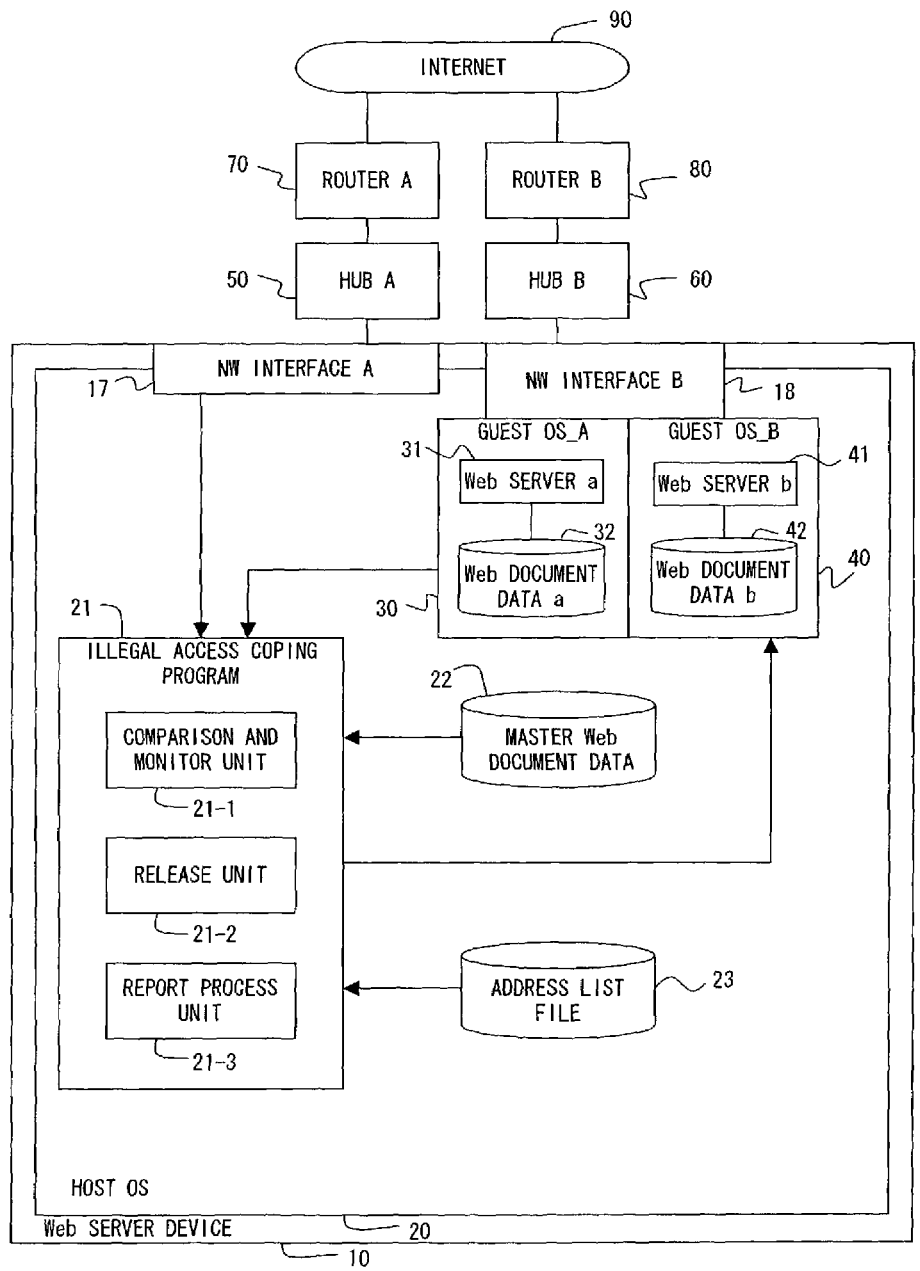
F I G. 4

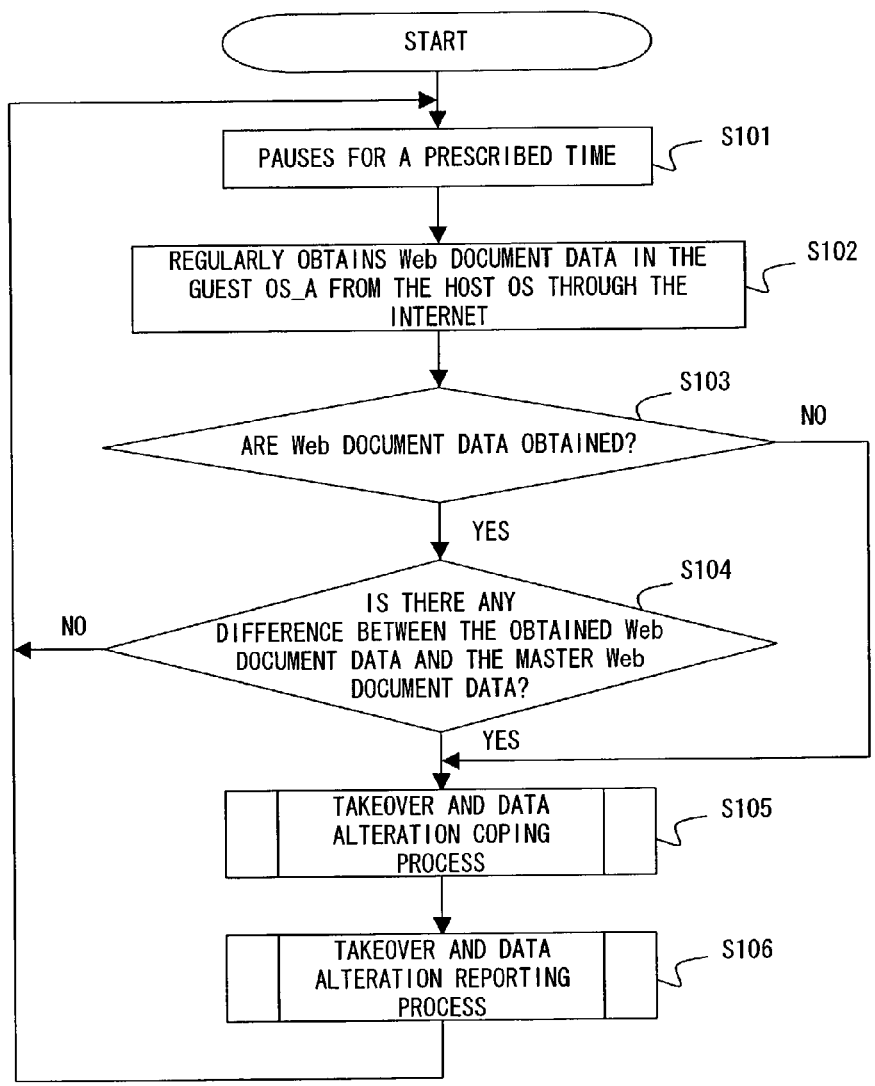
F I G. 5

| path/filename | size | update |
|---|---|---|
| index.html | 91 | 2002.01.25.11:29:00 |

F I G. 6

```
<html>
<body>
<br><img SRC="title. gif" height=30 width=30>
Welcome!
</body>
</html>
```

F I G. 7

| path/filename | size | update |
|---|---|---|
| index.html | 91 | 2002.02.09.00:11:11 |

FIG. 8

```
<html>
<body>
<br><img SRC="title. gif" height=30 width=30>
Goodbye!  ◀────────────────────────────  ALTERED DATA
</body>
</html>
```

F I G. 9

| REPORT ADDRESS | EXAMINATION MATERIAL SEND FLAG |
|---|---|
| admin@fijitsu.co.jp | 1 |
| 2ndadmin@fijitsu.co.jp | 0 |

F I G. 1 2

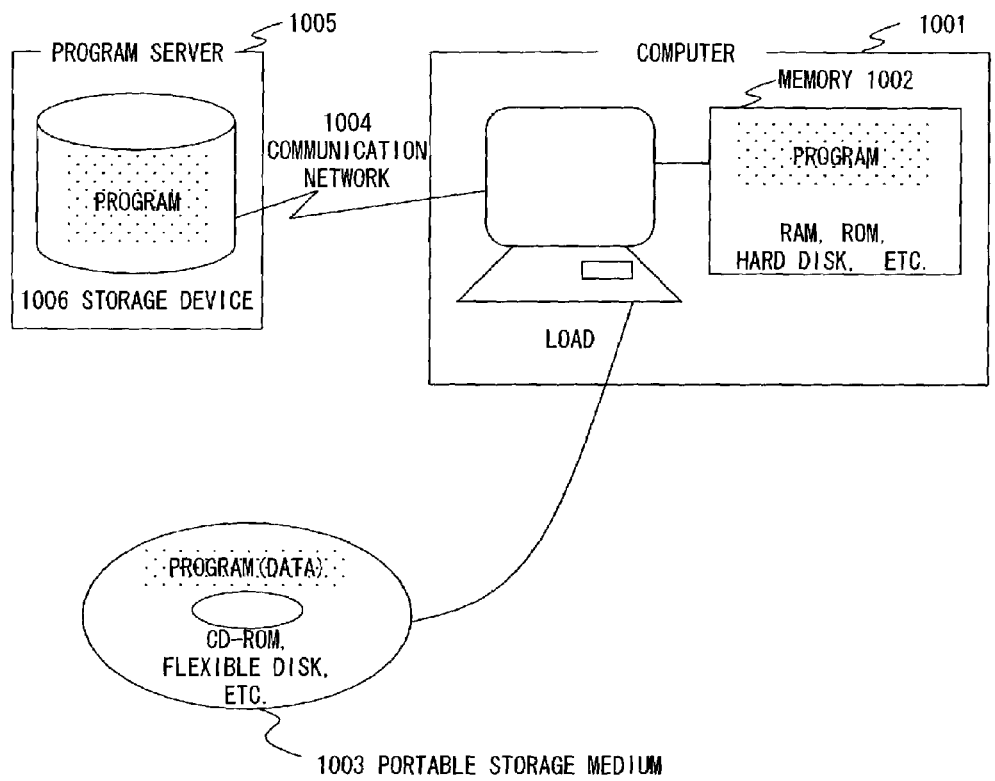
F I G. 1 3

METHOD AND DEVICE FOR COPING WITH ILLEGAL ACCESSES TO A DATA SERVER

BACKGROUND OF THE INVENTION

1. Field of the Invention

The present invention relates to a technology used in a data server device and in particular, relates to a technology for coping with illegal accesses to a data server device.

2. Description of the Related Art

Recently, data servers connected to networks have often been illegally accessed. As a result, the system has often been taken over or data stored in the server have often been altered.

Conventionally, the manager of the server often first finds out about the illegal access when a user reports that something is awry, which may be long after the original break-in. As a result, illegal access can continue for a long time.

When a system is taken over or data are altered by such an illegal access, generally, the server is immediately severed from the network. However, in particular, when the authority of the manager of the server is taken over, for example, the communication cable physically connecting the server to the network must be disconnected. In order to cope with this problem, maintenance personnel must always be near the server hardware.

In order to cope with such a situation, it is also possible to remotely switch off the power source of a relay device, such as a router connecting the data server to the network. However, in this case, if the relay device is shared with other computer systems, they will also be affected.

When a data server has been taken over or a data of the server has been altered, it is useful to obtain the traces of the takeover or data alteration from the server in order to prevent similar illegal accesses from happening again. However, if such trace information is for example, left in the main memory of the taken-over server, it is difficult to read the trace information in main memory since the server has already been taken over. Specifically, since when the server is restarted, the trace information left in main memory is also lost, it is difficult to obtain the trace information in main memory.

SUMMARY OF THE INVENTION

In view of the problems described above, it is an object of the present invention to automatically cope with illegal accesses to a data server.

An illegal access coping method, which is one aspect of the present invention, comprises: executing a secondary operating system on a primary operating system running on a computer; executing an application program for implementing a data server publishing data in a communication network on the secondary operating system; accessing the data server, which is implemented by executing the application program, under the management of the primary operating system; judging whether a response to the access received from the data server is normal or abnormal, under the management of the primary operating system; and obtaining data stored in memory managed by the secondary operating system, under the management of the primary operating system if it is judged that the response is abnormal.

Thus, even if the data server running on the secondary operating system is illegally accessed, the trace information left in the memory managed by the secondary operating system can be automatically obtained from the primary operating system.

Another illegal access coping method, which is another aspect of the present invention, comprises: executing a secondary operating system on a primary operating system running on a computer; executing an application program for implementing a data server publishing data in a communication network on the secondary operating system; accessing the data server, which is implemented by executing the application program, through the communication network under the management of the primary operating system; judging whether a response to the access received from the data server through the communication network is normal or abnormal, under the management of the primary operating system; and compulsorily terminating the execution of the secondary operating system managing the execution of the application program, under the management of the primary operating system if it is judged that the response is abnormal.

Thus, even if the data server running on the secondary operating system is illegally accessed, the influence is limited to the secondary operating system and does not reach the primary operating system. Therefore, the operation of the illegally accessed data server can be automatically stopped from the primary operating system.

BRIEF DESCRIPTION OF THE DRAWINGS

The present invention will be more apparent from the following detailed description when the accompanying drawings are referenced, in which:

FIG. 2 shows the second principle configuration of the present invention;

FIG. 3 shows the hardware configuration of a Web server device adopting the present invention;

FIG. 4 shows the functional configuration of a Web server device adopting the present invention;

FIG. 5 is a flowchart showing the content of an illegal access coping process;

FIG. 6 shows an example of a Web document data file;

FIG. 7 shows the content of the data file shown in FIG. 6;

FIG. 8 shows an example of an altered Web document data file;

FIG. 9 shows the content of the data file shown in FIG. 8;

FIG. 12 shows example data of a report address setting file; and

FIG. 13 shows examples of computer-readable storage media.

DESCRIPTION OF THE PREFERRED EMBODIMENTS

First, the principles of the present invention are described.

Figure 1:
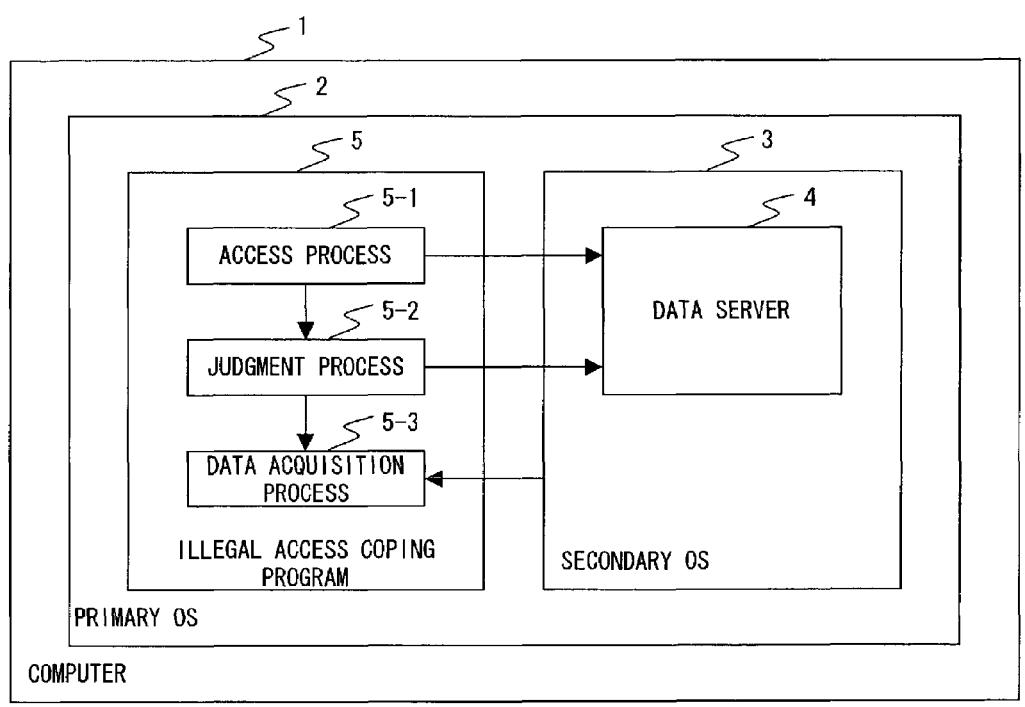
FIG. 1 shows the first principle configuration of the present invention.

FIG. 1 shows the first principle configuration.

In FIG. 1, a computer 1 comprises a CPU controlling each constituent component by executing a control program, a storage unit storing the control program that enables the CPU to control each constituent component and being used as a work area when the CPU executes the control program or the storage area of a variety of data, which is a ROM, a RAM, a magnetic storage device or the like, an input unit obtaining a variety of data corresponding to user's operations, an output unit presenting a variety of data on a display and the like and notifying a user of a variety of data and an I/F unit providing an interface function to connect the computer 1 to a network.

The primary OS 2 is a host operating system and the execution of the OS 2 in the computer 1 manages the basic function of the computer 1.

The secondary OS 3 is a guest operating system executed in the computer 1 under the management of the primary OS 2.

A data server 4 publishes data in a communication network, such as the Internet, and is implemented in the computer 1 by executing an application program running on the secondary OS 3 in the computer 1.

An illegal access coping program 5 is the subject matter of the present invention. The execution of the program 5 under the management of the primary OS 2 in the computer 1 enables the computer 1 to perform an access process 5-1, a judgment process 5-2 and a data acquisition process 5-3.

In the access process 5-1, the data server 4 is accessed. In the judgment process 5-2, it is judged whether the response to the access made by executing the access process 5-1 that is received from the data server 4 is normal or abnormal.

In the data acquisition process 5-3, data stored in memory managed by the secondary OS 3 are obtained if the response received from the data server 4 is judged to be abnormal in the judgment process 5-2.

As described above, the illegal access coping program 5 is executed under the management of the primary OS 2. However, an application program implementing the data server 4 in the computer 1 is executed in the computer 1 under the management of the secondary OS 3. Therefore, even if the data server 4 is illegally accessed, the trace information left in memory managed by the secondary OS 3 can be obtained by a data acquisition process 5-3 executed under the management of the primary OS 2. As described above, according to the first configuration of the present invention shown in FIG. 1, trace information that is left in memory managed by the secondary OS 3 can be obtained.

In the first principle configuration of the present invention, the data server 4 can be also accessed through the communication network by the access process 5-1, and it can also be judged whether a response to the access received from the data server 4 through the communication network is normal or abnormal by the judgment process 5-2.

Thus, since the behavior of the data server 4 can be monitored from the communication network side providing a service for publishing data, the behavior of the service is correctly provided can be monitored more accurately.

In the first principle configuration of the present invention described above, if a response to an access to the data server 4 cannot be obtained, it can also be judged that the response is abnormal by the judgment process 5-2.

If a response to an access to the data server 4 cannot be obtained, it is estimated that the access cannot be received by the data server 4, that is, it can be considered that there is an illegal access, such as the takeover of the data server 4 and the like. Thus, the trace, possibly containing information about an illegal access, in memory managed by the secondary OS 3 can be obtained.

In the first principle configuration of the present invention described above, if a response to an access to the data server 4 is different from one anticipated in advance, it can also be judged that it is abnormal by the judgment process 5-2.

If a response to an access to the data server 4 is different from one anticipated in advance, it can be considered that there is an illegal access, such as data alteration and the like, to the data server 4. Thus, the trace, possibly containing information about an illegal access in memory managed by the secondary OS 3 can be obtained.

In the first principle configuration of the present invention described above, if it is judged that the response to an access to the data server 4 is abnormal by the judgment process 5-2, the execution of the secondary OS 3 managing the execution of the application program that implements the data server 4 in the computer 1 can be further compulsorily terminated in the computer 1 by executing the illegal access coping program 5 under the management of the primary OS 2.

Since even if the data server 4 is illegally accessed, the influence reaches only the secondary OS 3 and does not reach into the primary OS 2, the execution of the secondary OS 3 can be compulsorily terminated by executing the illegal access coping program 5. Thus, the operation of the illegally accessed data server 4 can be automatically stopped.

In this case, after the execution of the secondary OS 3 is compulsorily terminated as described above, the secondary OS 3 can also be restarted under the management of the primary OS 2. Simultaneously, the computer 1 can construct the data server 4 in the computer 1 again by executing the application program described above again under the management of the secondary OS 3.

Since, thus, the compulsorily stopped data server 4 can be constructed in the computer 1 again, the data server's down time due to illegal access can be reduced. Since the illegal access coping program 5 and secondary OS 3 are both executed under the management of the primary OS 2, the data server 4 can be recovered rapidly.

In this case, if it is judged that a response to an access to the newly reconstructed data server 4 is abnormal, the computer 1 can also obtain the operational history of the data server 4 in addition to data stored in memory managed by the secondary OS 3 by executing the illegal access coping program 5 under the management of the primary OS 2.

Thus, if the data server 4 is illegally accessed repeatedly, the history of the data server 4 can be obtained as information with possible trace information, and the intruder's identify and break-in method can be analyzed more easily.

In the first principle configuration of the present invention described above, if is it judged that a response to an access to the data server 4 is abnormal, the computer 1 can further transmit information indicating the occurrence of an abnormality to prescribed addresses by executing the illegal access coping program 5 under the management of the primary OS 2.

Thus, even if there is no manager physically near the computer 1, a manager with such an address can be notified of the abnormality in the data server 4.

In this case, the computer 1 can also obtain and transmit data stored in memory managed by the secondary OS 3 and attach the data to information indicating the occurrence of the abnormality.

Thus, a manager placed located away from the computer 1 can analyze the trace information.

The computer 1 can also transmit the information indicating the occurrence of an abnormality to prescribed addresses. Simultaneously, the computer 1 can also obtain/attach and transmit data stored in memory managed by the secondary OS 3 to the information indicating the occurrence of the abnormality and sent it to some of the predetermined address.

Thus, since the data described above can be presented to only a manager having the ability to analyze the trace information, the possibility of leaking sensitive trace information can be reduced.

FIG. 2 shows the second principle configuration of the present invention. In FIG. 2, the same reference numbers are attached to the same constituent components as those shown in FIG. 1.

In FIG. 2, the same computer 1, primary OS 2, secondary OS 3 and data server 4 as those shown in FIG. 1 are used. However, the computer 1 further comprises a plurality of interfaces managing the transmission and reception of data through a communication network 6. One of the interfaces is managed by the primary OS 2 and the other is managed by the secondary OS 3. For the communication network 6, for example, the Internet is used.

The illegal access coping program 5 is the subject matter of the present invention, and the execution of the program 5 in the computer 1 under the management of the primary OS 2 enables the computer 1 to perform the access process 5-1, judgment process 5-2 and forced termination process 5-4.

In the access process 5-1, an access is made to the data server 4 through the communication network 6.

In the judgment process 5-2, it is judged whether a response to the access made by the execution of the access process 5-1 that is received from the data server 4 is normal or abnormal.

In the forced termination process 5-4, if in the judgment process 5-2, it is judged that the response received from the data server 4 is abnormal, the execution of the secondary OS 3 managing the execution of an application program that implements the data server 4 in the computer 1 is compulsorily terminated.

As described above, the computer 1 executes the illegal access coping program 5 under the management of the primary OS 2. However, the application program for implementing the data server 4 is executed under the management of the secondary OS 3 executed under the management of the primary OS 2. Therefore, since even if the data server 4 is illegally accessed, the influence reaches only the secondary OS 3 and does not reach into the primary OS 2, the execution of the secondary OS 3 can be compulsorily terminated by executing the illegal access coping program 5. Thus, the operation of the illegally accessed data server 4 can be automatically stopped. Furthermore, since the illegal access coping program 5 and secondary OS 3 are both executed under the management of the primary OS 2 executed in the computer 1, forced termination can be made rapidly.

The object of the present invention can be achieved by the illegal access coping method implemented in the illegal access coping program 5 executed by the computer 1 shown in FIGS. 1 and 2. Furthermore, the object of the present invention can be achieved by the illegal access coping device constructed by the computer 1 shown in FIGS. 1 and 2 that executes the illegal access coping program 5.

Next, the preferred embodiments of the present invention are described with reference to the drawings. Here, a Web server device publishing Web document data on the Internet using WWW (worldwide Web) system, which is the preferred embodiment of the present invention, is described.

FIG. 3 shows the hardware configuration of a Web server device adopting the present invention. The Web server device shown in FIG. 3 comprises a CPU 11, a RAM 12, a ROM 13, a HDD 14, an input unit 15, an output unit 16, a NW interface A17 and a NW interface B18. The units and devices are connected to one another by a bus 19, and can transmit/receive data to/from one another under the management of the CPU 11.

The CPU (central processing unit) 11 controls the entire operation of the Web server device (hereinafter called "this device") 10.

The RAM (random-access memory) 12 is used as a work area when the CPU 11 executes a variety of control programs, and is also used as main memory, which is also used as the temporary storage area of a variety of data, as requested.

The ROM (read-only memory) 13 is a memory storing in advance a basic control program to be executed by the CPU 11. If the CPU 11 executes this basic control program at the time of the start of this device 10, the CPU 11 can exercise the basic control of this entire device 10.

The HDD (hard disk drive) 14 is a hard disk device storing: a host OS (operating system) program for controlling the basic function of this device 10; a guest OS program for performing the same functional control as the host OS when being executed under the management of the host OS; a Web server program for providing a Web server function when being executed under the management of the guest OS; an illegal access coping program for monitoring illegal access by monitoring the operation of the Web server function provided by the Web server program when being executed under the management of the host OS and taking prescribed countermeasures when detecting an illegal access; a Web document data file storing Web document data published on the Internet by executing the Web server program; an address file storing data indicating addresses of the managers of this device 10 to which information about an illegal access is transmitted when the illegal access is detected during the execution of the Web server program; and the like.

The input unit 15 receives input from the outside and transfers the content of the input to the CPU 11. The input unit 15 comprises an input device receiving instructions from the operator operating this device 10, such as a keyboard, a mouse and the like, or a reader device for a portable storage medium, such as a FD (flexible disk), a CD-ROM (compact disk ROM), a DVD-ROM (digital versatile disk ROM), an MO (magneto-optical) disk and the like.

The output unit 16 outputs data according to instructions from the CPU 11. For the output unit 16, a display device with a CRT (cathode ray tube) or LCD (liquid crystal display) displaying a variety of data, a printer device printing a variety of data and the like are used.

The NW (network) interface A17 and NW interface B18 manage communications when this device 10 is connected to a LAN (local area network) and data are transmitted/received between this device 10 and an external device. This device 10 is provided with two NW interfaces.

This device 10 shown in FIG. 3 can also be configured by adding two NW interfaces to a standard computer.

FIG. 4 shows the functional configuration of this device 10. In FIG. 4, the same reference numbers are attached to the same constituent components as shown in FIG. 3.

As shown in FIG. 4, this device 10 is connected to the Internet 90 through the NW interface A17, a hub (concentrator device) A50 and a router A70, and is further connected to the Internet 90 through the NW interface B18, a hub B60 and a router B80. In other words, this device 10 is connected to the Internet 90 through two different communication lines.

When this device 10 is started and the CPU 11 starts the execution of the basic control program stored in the ROM 13, first the CPU 11 reads the host OS program from the HDD 14 and starts to execute the host OS 20.

Then, the CPU 11 reads the guest OS program from the HDD 14 and starts to execute the guest OS_A30. In this case, the NW interface A17 is managed by the host OS 20, while the NW interface BIB is placed under the management of the guest OS_A30.

Furthermore, the CPU 11 reads the Web server program and Web document data from the HDD 14, and constructs a Web server a31 for publishing the Web document data a32 in the Internet 90 by executing the Web server program under the management of the guest OS_A30.

Then, the CPU 11 reads the illegal access coping program 21 from the HDD 14 and starts the program under the management of the host OS 20. The execution of the illegal access coping program 21 enables the CPU 11 to function as a comparison and monitor unit 21-1, release process unit 21-2 and report process unit 21-3.

The comparison and monitor unit 21-1 compares the Web document a32 published on the Internet 90 by the Web server a31 with the master Web document data 22, the content of which is the same as that of the Web document data a32 stored in the HDD 14, and monitors the occurrence of illegal accesses.

The release process unit 21-2 collects trace information from the Web server a31 that is abnormally behaving due to an illegal access and also executes the guest OS_B40 under the management of the host OS 20. Furthermore, the unit 21-2 constructs a Web server b41 for publishing Web document data b42, the content of which is the same as that of the Web document a32, on the Internet 90 by executing the Web server program under the management of the guest OS_B40.

The report process unit 21-3 transmits information indicating the occurrence of an illegal access and trace information obtained by the release process unit 21-2, to addresses listed in an address list file 23.

The content of an illegal access coping process performed by the CPU 11 executing the illegal access coping program 21 is described below. FIG. 5 is a flowchart showing the content of this process.

In FIG. 5, the comparison and monitor unit 21-1 performs processes in steps S101 through S104, the release process unit 21-2 performs a process in step S105, and the report process unit 21-3 performs a process in step S106.

First, in step S101, the process is temporarily paused for a prescribed time. If this pause interval is reduced, the monitor checks the WEB server more often. However, in this case, the process load of this device 10 also increases proportionally. Therefore, the waiting time is determined taking both factors into consideration.

In step S102, an access to the Web server a31 through the Internet 90 is made through the NW interface A17, hub A50 and router A70. As a result, the Web document data a32 published on the Internet 90 through the hub B60 and router B80 by the Web server a31 can be obtained from the NW interface A17. This Web server a31 can also be accessed by transmitting an ID (identification) and a password to the Web server a31 through the Internet 90.

Instep S103, it is tested whether the Web document data a32 can be obtained in step S102. If it can, the flow proceeds to step S104. If it can't, it is concluded that there has been an illegal access, such as a takeover and the like, in the Web server a31 and the flow proceeds to step S105.

In step S104, the content of the Web document data a32 obtained in step S102 is compared with that of the master Web document data 22, and it is tested whether they are the same. If they are, the flow returns to step S101 and the Web server function monitor by this device 10 is repeated. If they are different, it is concluded that there has been an illegal access, such as data alteration in the Web server a31, and the flow proceeds to step S105.

The process in step S104 is described in more detail using example data shown in FIGS. 6 through 9.

FIG. 6 shows an example of the Web document data file. This Web document data file is named "index.html". It is shown that the size of the file is 91 bytes and the date of the last modification, herein after referred to as the "timestamp", is "2002.01.25 11:29:00". FIG. 7 shows the content of the Web document data file "index.html". This data file stores Web document data described in HTML (hypertext markup language).

FIGS. 8 and 9 show an example of the Web document data file being altered. According to the attribute information of the Web document data file shown in FIG. 8, the timestamp is "2002.02.09 00:11:11" and is different from the timestamp shown in FIG. 6. The fourth line of the content of the Web document data file "index.html" in FIG. 7 has been changed to "Goodbye!" in FIG. 9.

In the process of step S104, these attribute information of the Web document data file are compared, as shown in FIGS. 6 and 8. Simultaneously, the contents of the Web document data files are compared, as shown in FIGS. 7 and 9. Only if all of these are the same it is judged that they are the same, that is, the judgment in step S104 is "yes".

Description returns to FIG. 5. In step S105, a take over and data alteration coping process is performed, and in step S106, a takeover and data alteration report process is performed. Then, the flow returns to step S101 and Web server function monitor by this device 10 is repeated. The details of the takeover and data alteration coping process and takeover and data alteration report process are described below.

Afterwards, the processes starting from step S101 is repeated and the operation monitor of the Web server a31 is regularly conducted through the Internet 90.

These processes described above constitute the illegal access coping process.

Figure 10:
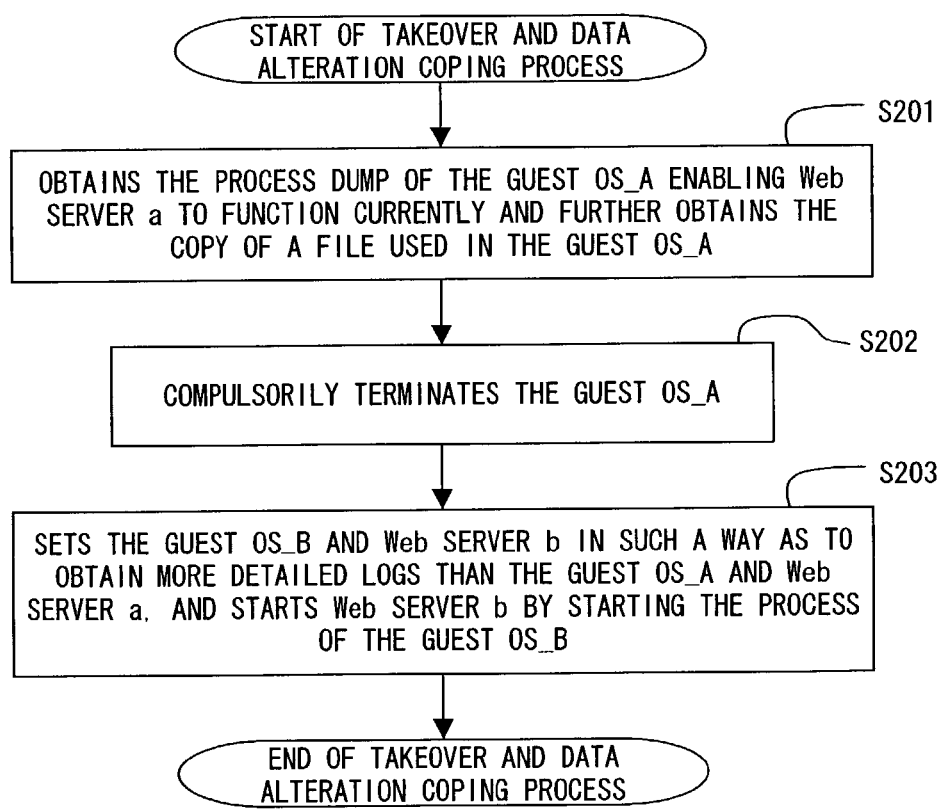
FIG. 10 is a flowchart showing the content of a takeover/data alteration coping process.

Next, the takeover and data alteration coping process, which is the process in step S105 shown in FIG. 5, is described. FIG. 10 is a flowchart showing the content of the takeover and data alteration coping process.

First, in step S201, the process-dump of the guest OS_A30 running the Web server a31 is obtained from the RAM 12. Furthermore, a variety of data files used in the guest OS_A30, such as a log data file recording the operational histories of the Web server a31 and guest OS_A30 and the like, are copied, and the data are temporarily stored on the HDD.

Since the guest OS_A30 is just one of the processes running on the host OS 20, the process-dump of the guest OS_A30, which can be the trace information described above, can be obtained from the RAM 12 by performing the takeover and data alteration coping process executed under the management of the host OS 20. Copies of the variety of data files that are used in the guest OS_A30, obtained together with the process-dump is also part of the trace information. Also, information indicating the execution environment of the guest OS_A 30 observed by the host OS 20 and the like can also be obtained as the trace information.

Thus, since the guest OS_A30 running the Web server a31 and illegal access coping process are executed in parallel in the host OS 20, this device 10 can easily obtain trace information about an illegal access to the Web server a31 from the RAM 12.

In step S202, the guest OS_A30 is compulsorily terminated.

In step S203, the guest OS program is read from the HDD 14, and the execution of the guest OS_B40 is started. Furthermore, the Web server program and Web document data are read from the HDD 14 under the management of the guest OS_B40, the Web server program is executed and a Web server b41 for publishing Web document data b42, which is the same as the Web document a32, in the Internet 90 is constructed. In this case, when the operational histories of the Web server b41 and guest OS_B40 are recorded in a log data file, the content thereof can be more detailed than that of the operational histories of the Web server a31 and guest OS_A30. Then, if there is a new illegal access, trace information more detailed than before can be obtained. Such trace information is useful to counter illegal access.

When the processes described above finish, the takeover and data alteration coping process terminates, and the flow returns to FIG. 5. In the subsequent processes of step S102 and after shown in FIG. 5, the acquisition of the Web document data b42 is attempted through the Internet 90 and the operation of the Web server b41 is monitored. In the subsequent process in step S101 for temporarily pausing the progress of the subsequent processes for a prescribed time, the prescribed time set previously can also be shortened. Thus, the monitor interval for Web server b41 can be made shorter than that of Web server a31, and the acquisition of trace information about a new illegal access and the release of the Web server function can be expedited, which is useful.

Figure 11:
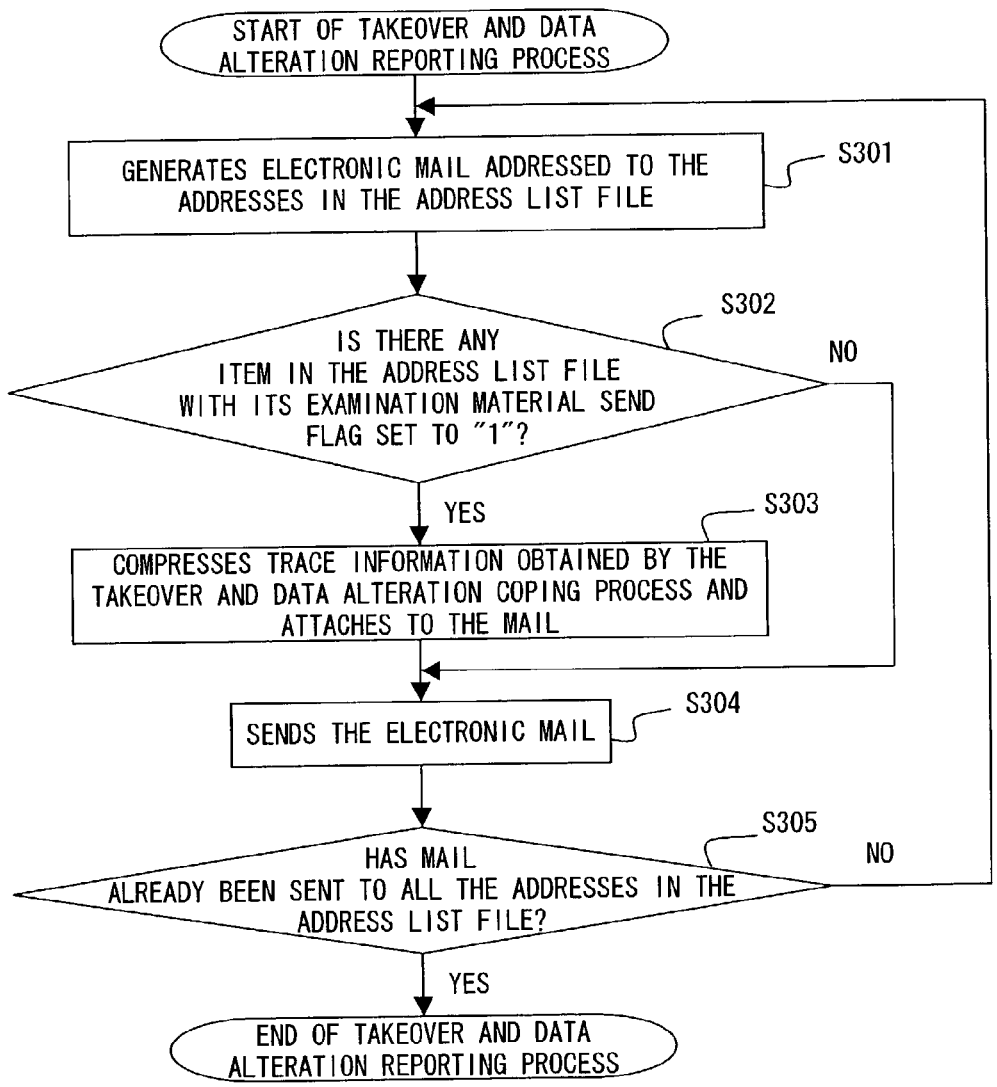
FIG. 11 is a flowchart showing the content of a takeover/data alteration reporting process.

Next, the takeover and data alteration reporting process, which is the process in step S106 of FIG. 5, is described. FIG. 11 is a flowchart showing the content of the takeover and data alteration reporting process.

First, in step S301, the address list file 23 is referenced and electronic mail addressed to the addresses listed in the file is generated. In the body of the electronic mail, the fact that there is an abnormality in a Web server function provided by this device 10 and a detailed description of the abnormality, for example, the fact that Web document data a32 cannot be obtained through the Internet 90 (that is, the judgment in step S103 of FIG. 5 is "no"), the fact that the obtained Web document data a32 is different from the master Web document data 22 (that is, the judgment in step S104 of FIG. 5 is "no") and the like, are described.

In step S302, it is judged whether there is an address in the address list file 23 with its examination material send flag set to "1". Only when the judgment is "yes", is step S303 performed. If the judgment is "no", the flow proceeds to step S304.

In step S303, the data file obtained by applying a publicly known reversible data compression process to the trace information that is obtained by the process in step S201 of the takeover and data alteration coping process shown in FIG. 10 are attached to the electronic mail addressed to the addresses with an affirmative examination material send flag.

FIG. 12 shows example data of the address list file 23. In it, an examination material send flag is set for each of the electronic mail addresses. In this case, the examination material send flag for the address on the upper line is set to "1" and the trace information is attached to the electronic mail sent to this address. The examination material send flag for the address on the lower line is set to "0", and the trace information is not attached to the electronic mail sent to this address. In this way, this device 10 can limit the receivers of the trace information to only managers having the ability to analyze the trace information and the like, which is useful and important for security reasons.

In step S304, the generated electronic mail is sent from the NW interface A17 to the Internet 90 through the hub A50 and router A70.

In step S305, it is judged whether the electronic mail has been sent to all addresses defined in the address list file 23. If it has, the takeover and data alteration report process terminates and the flow returns to FIG. 5. If not, the flow returns to step S301, and new electronic mail is generated and sent.

These processes described above constitute the takeover and data alteration report process.

If the CPU 11 of this device 10 performs the illegal access coping process consisting of the processes shown in FIGS. 5, 10 and 11 under the management of the host OS 20, monitoring illegal accesses, such as takeovers, data alterations and the like, the acquisition of trace information due to illegal access and the release of the Web server function can be automatically performed.

The present invention can also be realized by recording an illegal access coping program 21 that enables a computer to perform such a process, on a computer-readable storage medium and enabling the computer to read and execute the program from the storage medium.

FIG. 13 shows examples of storage media from which a computer can read the recorded control program. As shown in FIG. 13, for the storage medium, a memory 1002, such as a RAM, a ROM, a hard disk device, etc., which are built into a computer 1001 or are externally attached to the computer 1001, or a portable storage medium 1003, such as a flexible disk, an MO (magneto-optical disk), a CD-ROM, a DVD-ROM, etc., and the like can be used. Alternatively, the storage medium can be a storage device 1006 that is connected to the computer 1001 through a communication line 1004 and is provided for a computer functioning as a program server 1005. In this case, a transmission signal obtained by modulating a carrier wave by a data signal representing the control program is transmitted from the program server 1005 to the computer 1001 through the communication line 1004. On receipt of the transmission signal, the computer 1001 reproduces and executes the control program by demodulating the transmission signal.

In addition, the present invention is not limited to the preferred embodiments described above, and a variety of improvement and modification can also be applied to the present invention.

For example, instead of executing the guest OS_A30 and guest OS_B40 under the management of the host OS 20, an emulation program virtually constructing a hardware environment corresponding to this device 10 under the management of the host OS 20 can also be executed, and the guest OSs and illegal access coping program can also be executed in the constructed virtual environment.

If the process can be managed by the host OS 20, the same type of an OS as the host OS 20 can be also adopted and configured as a guest OS.

Although in the preferred embodiments described above, the guest OS_A30 and guest OS_B40 use the main memory of the Web server device 10 as a main memory, the guest OS_A30 and guest OS_B40 that are started under the management of the host OS 20 can also use memory (or memory area) other than the main memory of the Web server device 10. In this configuration, the takeover and data alteration coping process shown in FIG. 10 is performed, data stored in the main memory of the Web server device 10 is obtained together with data stored in a memory (or memory area) that the guest OS_A30 uses as its main memory, and these two pieces of data are stored together on the HDD.

As described above, according to the present invention, the traces of an illegal access to a data server that are left in a computer constructing the data server can be automatically obtained or the operation of an illegally accessed data server can be automatically stopped rapidly.

What is claimed is:

1. A method for coping with an illegal access to a computer, comprising:
    executing a secondary operating system on a primary operating system running on the computer;
    executing an application program for implementing a data server publishing data in a communication network on the secondary operating system;
    accessing the data server, which is implemented by executing the application program, under the management of the primary operating system;
    judging whether a response to the access received from the data server is normal or abnormal, under the management of the primary operating system; and
    obtaining data stored in memory managed by the secondary operating system, under the management of the primary operating system if it is judged that the response is abnormal.

2. The method according to claim 1, wherein the access to the data server is made through said communication network, and the response to the access is received through said communication network.

3. A method for coping with an illegal access to a computer, comprising:
    executing a secondary operating system on a primary operating system running on the computer;
    executing an application program for implementing a data server publishing data in a communication network on the secondary operating system;
    accessing the data server, which is implemented by executing the application program, through the communication network under the management of the primary operating system;
    judging whether a response to the access received from the data server through the communication network is normal or abnormal, under the management of the primary operating system; and
    compulsorily terminating the execution of the secondary operating system managing the execution of the application program, under the management of the primary operating system if it is judged that the response is abnormal.

4. A device for coping with an illegal access to a data server publishing data in a communication network that is implemented in the computer by executing an application program on a secondary operating system executed on a primary operating system running on the computer, comprising;
    an access unit accessing the data server, which is implemented by executing the application program, under the management of the primary operating system;
    a judgment unit judging whether a response to the access received from the data server is normal or abnormal, under the management of the primary operating system; and
    a data acquisition unit obtaining data stored in memory managed by the secondary operating system, under the management of the primary operating system if it is judged that the response is abnormal.

5. A device for coping with an illegal access to a data server publishing data in a communication network that is implemented in the computer by executing an application program on a secondary operating system executed on a primary operating system running on the computer,
    said computer having a plurality of interfaces managing the transmission and reception of data through the communication network, and
    said device, comprising;
    an access unit accessing the data server, which is implemented by executing the application program, through the communication network under the management of a primary operating system;
    a judgment unit judging whether a response to the access received from the data server through the communication network is normal or abnormal, under the management of the primary operating system; and
    a forced termination unit compulsorily terminating the execution of the secondary operating system managing the execution of the application program, under the management of the primary operating system if it is judged that the response is abnormal.

6. A device for coping with an illegal access to a data server publishing data in a communication network that is implemented in the computer by executing an application program on a secondary operating system executed on a primary operating system running on the computer, comprising;
    access means for accessing the data server, which is implemented by executing the application program, under the management of the primary operating system;
    judgment means for judging whether a response to the access received from the data server is normal or abnormal, under the management of the primary operating system; and
    data acquisition means for obtaining data stored in memory managed by the secondary operating system, under the management of the primary operating system if it is judged that the response is abnormal.

7. A device for coping with an illegal access to a data server publishing data in a communication network that is implemented in the computer by executing an application program on a secondary operating system executed on a primary operating system that is running on the computer,
    said computer having a plurality of interfaces managing the transmission and reception of data through the communication network, and
    said device, comprising;
    access means for accessing the data server, which is implemented by executing the application program, through the communication network under the management of a primary operating system;
    judgment means for judging whether a response to the access received from the data server through the communication network is normal or abnormal, under the management of the primary operating system; and
    forced termination means for compulsorily terminating the execution of the secondary operating system managing the execution of the application program, under the management of the primary operating system if it is judged that the response is abnormal.

* * * * *